(12) United States Patent
Bandelier

(10) Patent No.: US 8,588,851 B2
(45) Date of Patent: Nov. 19, 2013

(54) ANDROID MOBILE TELEPHONE COMPRISING A CONTENT SUPPLY CHAIN

(75) Inventor: Thomas Bandelier, Albens (FR)

(73) Assignee: Myriad Group AG, Zurich (CH)

(*) Notice: Subject to any disclaimer, the term of this patent is extended or adjusted under 35 U.S.C. 154(b) by 265 days.

(21) Appl. No.: 13/136,266

(22) Filed: Jul. 27, 2011

(65) Prior Publication Data
US 2012/0088551 A1 Apr. 12, 2012

(30) Foreign Application Priority Data

Jul. 29, 2010 (FR) ...................................... 10 56256

(51) Int. Cl.
*H04B 1/38* (2006.01)
(52) U.S. Cl.
USPC ............................ 455/558; 455/419; 455/566
(58) Field of Classification Search
USPC ........................................................ 455/558
See application file for complete search history.

(56) References Cited

U.S. PATENT DOCUMENTS

| | | | |
|---|---|---|---|
| 8,311,585 B2 * | 11/2012 | Stewart ......................... | 455/566 |
| 2008/0049957 A1 * | 2/2008 | Topholm ....................... | 381/315 |
| 2009/0061840 A1 * | 3/2009 | Fleischman et al. .......... | 455/419 |

OTHER PUBLICATIONS

Gianluigi Me: "Internal Acquisition for Mobile Equipments," Parrallel and distributed processing, 2008. IPDPS 2008. IEEE International Symposium on, IEEE Piscataway, NJ, USA Apr. 14, 2008, pp. 1 to 7.

* cited by examiner

*Primary Examiner* — Ajibola Akinyemi
(74) *Attorney, Agent, or Firm* — Davidson, Davidson & Kappel, LLC

(57) ABSTRACT

The mobile telephone includes a data storage divided into a plurality of storage volumes. Each storage volume includes at least one partition, each partition of each storage volume being adapted to store content. The mobile telephone also includes a supply chain for content stored in the storage volumes with the user, the chain including:

- a detector for detecting storage volumes;
- a reader for reading storage volumes;
- a content supply device for supplying content to applications of the telephone; and
- at least one content presentation application.

The reader for reading the storage volumes includes a plurality of volume scanners, the content supply devicer includes a plurality of content suppliers, and the storage volume detector includes a single daemon and a single program for listening to the daemon.

11 Claims, 5 Drawing Sheets

ANDROID MOBILE TELEPHONE COMPRISING A CONTENT SUPPLY CHAIN

This claims the benefit of French Patent Application FR 10 56256, filed on Jul. 29, 2010 and hereby incorporated by reference herein.

BACKGROUND

The present invention relates to a mobile telephone, managed by an Android platform housing applications, of the type comprising a data storage means, divided into a plurality of storage volumes, each storage volume including at least one partition, each partition of each storage volume being adapted to store content, the mobile telephone comprising a supply chain for supplying content stored in the storage volumes to the user, said chain comprising:

- a means for detecting storage volumes;
- a means for reading storage volumes;
- a means for supplying content to applications; and
- at least one content presentation application.

Such mobile telephones are known and are intended to perform different functions, such as telephony, Internet browsing, or multimedia content management. This multimedia content is generally music, images or videos, stored in a memory of the telephone or accessible by a network communication means.

To be able to store multimedia content on the mobile telephone, the Android software platform provides a supply chain for supplying content from two storage volumes: the internal memory of the telephone and an SD card. The user thus has access to the content stored in the internal memory of the telephone and on the SD card, and is offered the possibility of recording content on the SD card.

However, the current systems are not fully satisfactory. In fact, SD cards are very specific data storage means, but other flash memory card standards exist that cannot be used on a mobile telephone using the Android operating system.

Furthermore, mobile telephones include a card containing a micro-controller and memory containing different connection data for the user. This card, commonly called UICC (Universal Integrated Circuit Card), is commonly referred to by the expression "SIM card." Today, so-called multimedia SIM cards commonly designated by the expression MMSIM are appearing, these cards integrating a web server and an auxiliary storage memory. However, Android is not adapted to manage the auxiliary storage memory of these MMSIM cards.

SUMMARY OF THE INVENTION

It is an object of the present invention to provide a mobile telephone, operating under Android, and compatible with auxiliary storage means other than SD cards.

The present invention provides a mobile telephone of the aforementioned type, characterized in that the means for reading the storage volumes comprises a plurality of volume scanners and in that the content supply means comprises a plurality of content suppliers, the storage volume detection means comprising a single daemon and a single program for listening to the daemon.

The mobile telephone according to the invention can also comprise one or more of the following features, considered alone or according to all technically possible combinations:

- the volume scanners comprise a multi-volume scanner, adapted to scan several storage volumes, and at least one single-volume scanner, adapted to scan only a single storage volume;
- the volume scanners comprise at least one secured partition scanner, adapted to scan encrypted partitions of the storage volumes;
- the or each secured partition scanner is specific to a single storage volume;
- the content suppliers comprise a multi-volume content supplier, adapted to provide content stored on different volumes, and at least one single-volume content supplier, adapted to provide only content stored on a same storage volume;
- the content suppliers comprise at least one encrypted content supplier, adapted to make encrypted content, stored on encrypted partitions of the storage volumes, available to the applications;
- the or each encrypted content supplier is specific to a single storage volume;
- the content supply means comprises databases for storing information collected by the volume scanners and representative of the content stored on the storage volumes, the content suppliers being adapted to make this information available to the applications, each database storing information representative of the content stored on a same storage volume;
- the databases comprise at least one secured database for storing information representative of encrypted content stored on encrypted partitions of the storage volumes;
- one of the storage volumes is a memory of a multimedia SIM card connected to the telephone, the multimedia SIM card incorporating a web server and an auxiliary storage memory;
- the SIM card includes at least one encrypted partition for storing encrypted data.

BRIEF DESCRIPTION OF THE DRAWINGS

Other features and advantages of the invention will appear more clearly upon reading the following description, provided solely as an example and done in reference to the appended drawings, in which.

DETAILED DESCRIPTION

Figure 1:
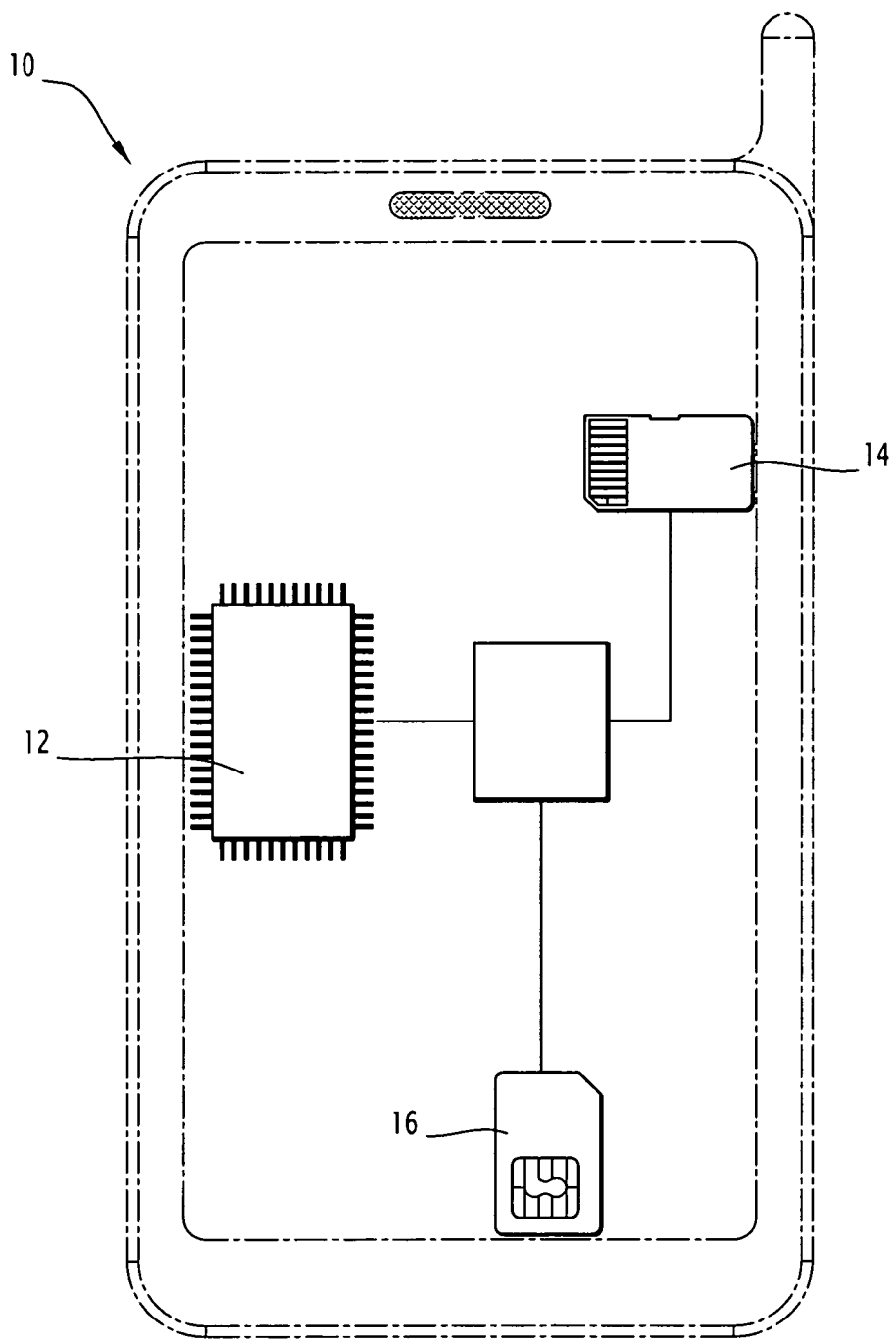
FIG. 1 is a diagrammatic illustration of a mobile telephone according to the invention.

As illustrated in FIG. 1, the telephone according to the invention implements a physical structure 10, made up as known in itself of a processor, an internal memory 12 adapted for the data and programs implemented by the processor, a communication means for communicating with a network, as well as sound and visual supply means for content received by the telephone or available therein. It also includes an SD card 14 and a multimedia SIM card 16, commonly designated as MMSIM.

The MMSIM card 16 integrates a web server 116 and an auxiliary storage memory 216, shown schematically.

The internal memory 12, the SD card 14 and the memory of the MMSIM card 16 each separately form a distinct storage volume and together constitute data storage means of the telephone.

Figure 2:
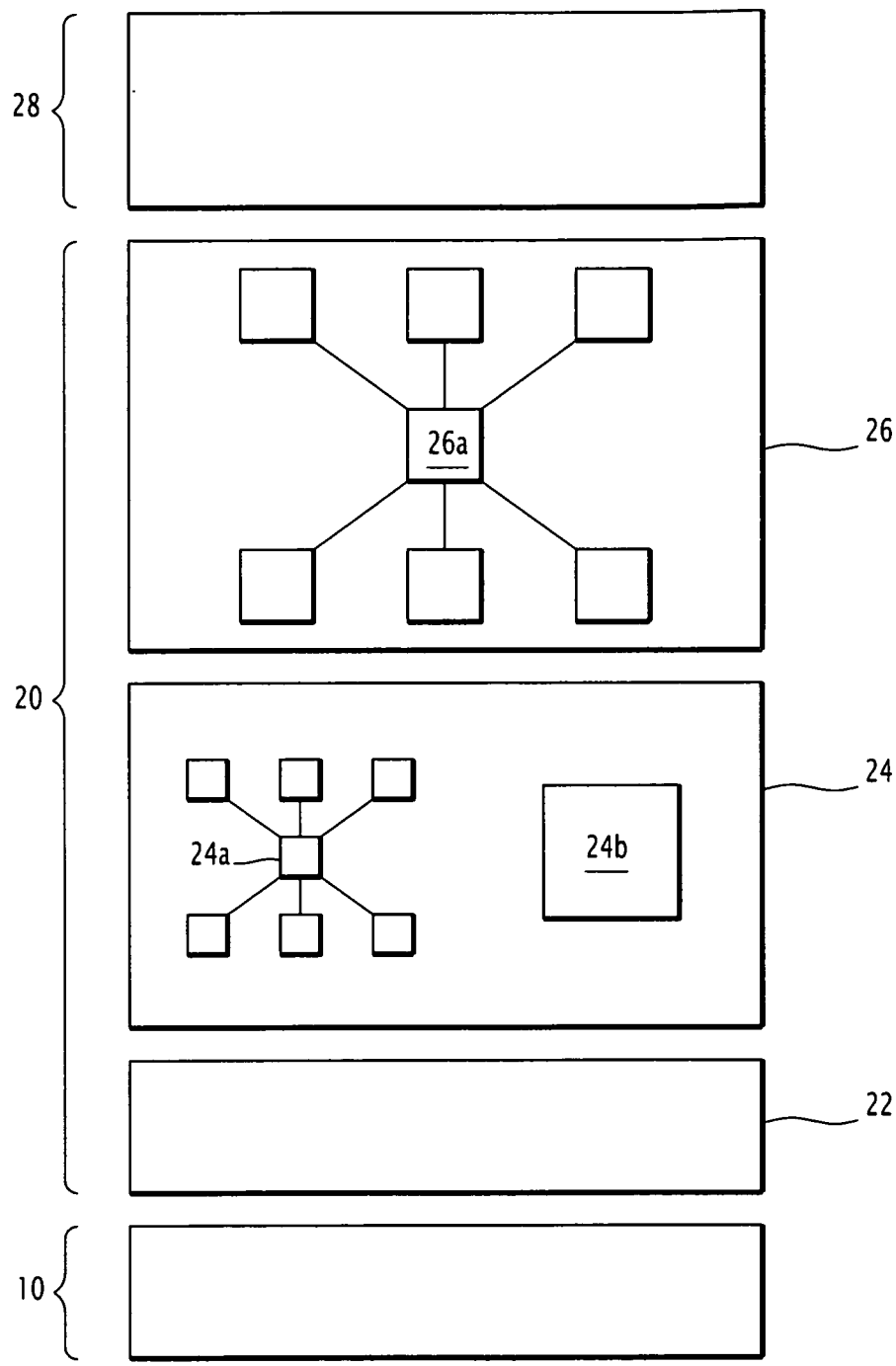
FIG. 2 is a diagram of a software platform managing the telephone of FIG. 1.

The telephone is managed by an Android software platform 20, diagrammatically shown in FIG. 2. The software platform 20 comprises a core 22, a native layer 24 and a system layer 26, called "framework." It serves as the interface between the physical structure 10 of the telephone and the applications 28.

The core 22 is based on version 2.6 of the Linux core. It is adapted to manage essential services such as the security of the platform, memory management, or process management. The core also forms a layer of abstraction between the physical structure 10 of the telephone and the native layer 24.

The native layer 24 is written in the C/C++ computer language. It includes software libraries 24a grouping together a set of functions available to the programs implemented by the processor, as well as a virtual machine 24b adapted to implement Java programs.

The system layer 26 is written in the Java computer language. It comprises Java programs 26a adapted to be implemented by the virtual machine 24b.

Figure 3:
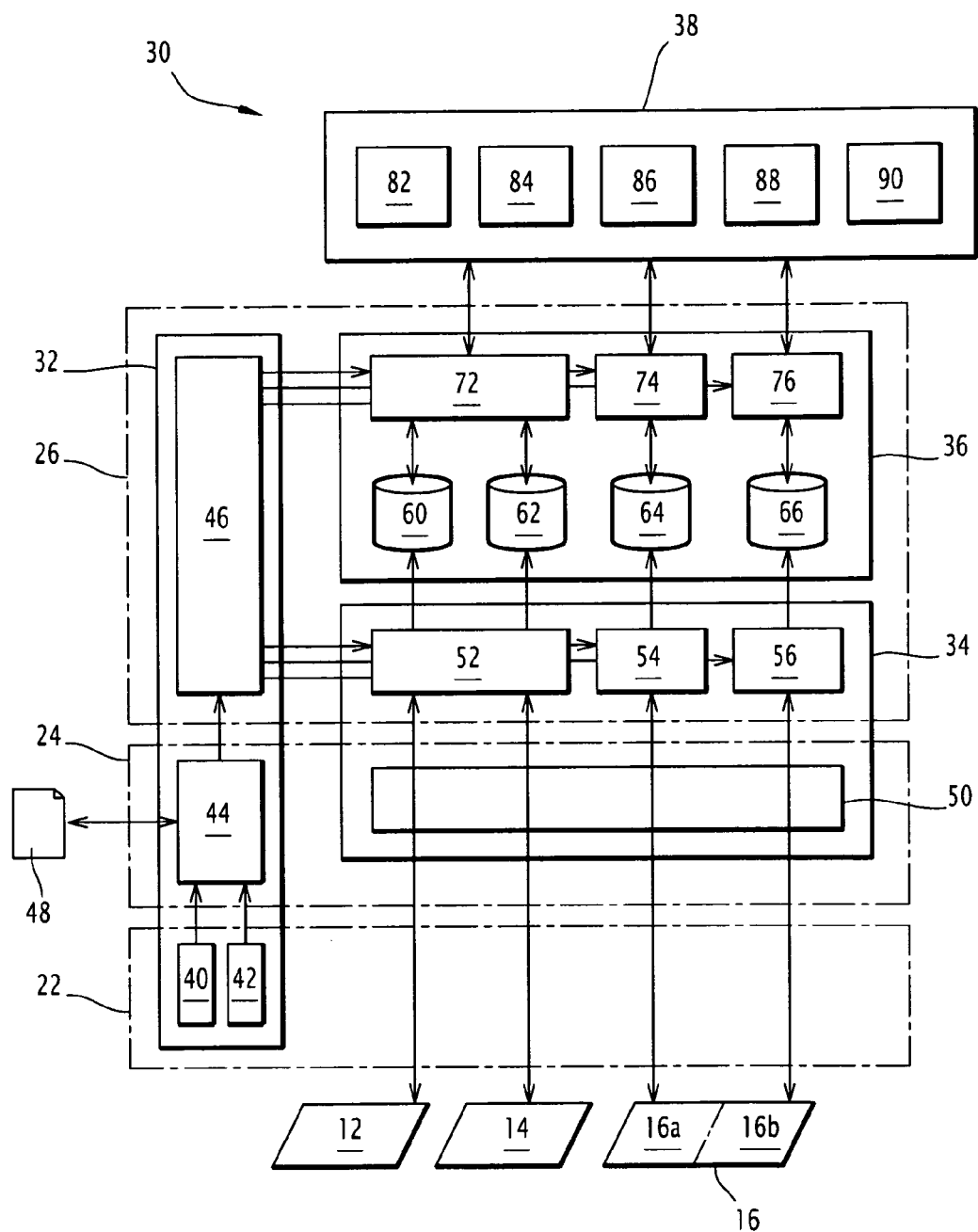
FIG. 3 is a diagram of a content supply chain for the telephone of FIG. 1.

As visible in FIG. 3, the internal memory 12 and the SD card 14 each include a single partition and the MMSIM card 16 includes a non-encrypted partition 16a and an encrypted partition 16b.

Each partition of each storage volume 12, 14, 16 is adapted to store content, and in particular multimedia content such as images, videos or music.

The telephone also comprises a content supply chain 30, shown by FIG. 3, to make the content stored on the storage volume 12, 14, 16 available to the user of the telephone.

The chain 30 comprises a detection means, or detector, 32 of the storage volumes 12, 14, 16, a means, or content supply device, 36 for making the content available to the applications 28, and an application for presenting content 38.

The detection means 32 of the storage volumes 12, 14, 16 comprises an SD card detection module 40, an MMSIM card detection module 42, a daemon 44 and a listening program 46 for the daemon 44.

The SD card 40 and MMSIM card 42 detection modules are installed in the core 22 of the Android platform 20. The daemon 44 is installed in the native layer 24 and the listening program 46 is installed in the system layer 26.

The daemon 44 is a program that is started when the telephone is started up and remains active until the telephone is turned off.

In general, the daemon 44 is adapted to communicate with the SD card detection module 40 by using a UEVENT mechanism to listen to information coming from the module 40. The module 40 provides the daemon 44 with information on the presence of an SD card 14.

Specifically, the daemon 44 is adapted to communicate with the MMSIM card detection module 42 by using a UEVENT mechanism to listen to information coming from the module 42. The module 42 provides the daemon 44 with information on the presence of the MMSIM card 16.

Furthermore, the daemon 44 is adapted to read, upon start-up, a configuration file 48 specifying the detection modules it must listen to. The configuration file 48 includes a command specifying that the daemon 44 must listen to the information from the MMSIM card detection module 42.

The daemon 44 is adapted to control the assembly and disassembly of the storage volumes 12, 14, 16 as a function of the content of the configuration file 48, and to provide information on the assembly and disassembly of the storage volumes 12, 14, 16 to the listening program 46 via an inter-process communication, generally known as a socket.

The listening program 46 is adapted to notify subscribed programs of the system layer 26 of the assembly or disassembly of each of the storage volumes 12, 14, 16.

The reading means 34 of the storage volumes 12, 14, 16 comprises a scanning module 50 of the storage volumes 12, 14, 16 and of the volume scanners 52, 54, 56.

The scanning module 50 is installed in the native layer 24 of the Android platform 20. The volume scanners 52, 54, 56 are Java programs and are installed in the system layer 26.

The volume scanners 52, 54, 56 are subscribed to the listening program 46 so as to be notified in case of assembly or disassembly of one of the storage volumes 12, 14, 16.

Each volume scanner 52, 54, 56 is adapted to scan at least one partition of a storage volume 12, 14, 16, upon assembly of said volume, by calling on the scanning module 50, and to record collected information, representative of the content stored on the or each partition, in at least one database 60, 62, 64, 66.

The volume scanner 52, 54, 56 comprise a multi-volume scanner 52, adapted to scan the internal memory 12 and the SD card 14, and two single-volume scanners 54, 56, each adapted to scan only the MMSIM card 16.

The volume scanner 56 also constitutes a secured partition scanner, adapted specifically to scan the encrypted partition 16b of the MMSIM card, whereas the volume scanner 54 is only adapted to scan the unencrypted partition 16a.

Alternatively, the secured partition scanner 56 is adapted to scan several encrypted partitions of the MMSIM card 16.

The multi-volume scanner 52 is adapted to record the information representative of the content stored on the internal memory 12 in a first database 60 and the information representative of the content stored on the SD card 14 in a second database 62, separate from the first.

The single-volume scanners 54, 56, respectively, are adapted to store the information representative of the content stored on the unencrypted partition 16a, on the encrypted partition 16b, respectively, in a third 64, fourth 66, respectively, database.

The means 36 for supplying content to applications 28 comprises the databases 60, 62, 64, 66 and the content suppliers 72, 74, 76.

Each database 60, 62, 64, 66 stores information representative of content stored on a same partition of a storage volume 12, 14, 16.

Alternatively, the database 64 is adapted to store information representative of content stored on several unencrypted partitions of the MMSIM card 16, and the secured database 66 is adapted to store information representative of encrypted content stored on several encrypted partitions of the MMSIM card 16.

Each content supplier 72, 74, 76 is adapted to read the information stored in at least one database 60, 62, 64, 66, with which it is associated, and to make that information available to the applications 28. Each content supplier 72, 74, 76 is adapted to supply any application 28 with a list of content stored on at least one partition of one of the storage volumes 12, 14, 16, based on criteria used by the application 28 and communicated to the content supplier 72, 74, 76 via a request.

The content suppliers 72, 74, 76 comprise a multi-volume content supplier 72, adapted to read the databases 60 and 62 to make content stored on the internal memory 12 and the SD card 14 available to the applications 28.

The content suppliers also comprise two single-volume content suppliers 74, 76, respectively, each adapted only to read a single database 64, 66, respectively, and to provide the applications 28 only with the content of the MMSIM card 16.

The content supplier 76 also constitutes a secured content supplier, adapted to read the secured database 66 and to provide applications 66 with the contents of the encrypted partition 16b, whereas the content supplier 74 is only adapted to provide the applications 28 with the contents of the unencrypted partitions 16a.

Each content supplier 72, 74, 76 is adapted to mask the content of the or each database 60, 62, 64, 66, respectively, with which it is associated with the applications 28, when the or each associated partition or storage volume 12, 14, 16a, 16b, respectively, is disconnected. In particular, the secured content supplier 76 is adapted to erase the contents of the secured database 66 when the partition 16b is disconnected.

To that end, each content supplier 72, 74, 76 subscribes to the listening program 46 so as to be notified in the event of assembly or disassembly of one of the storage volumes 12, 14, 16.

Figure 4:
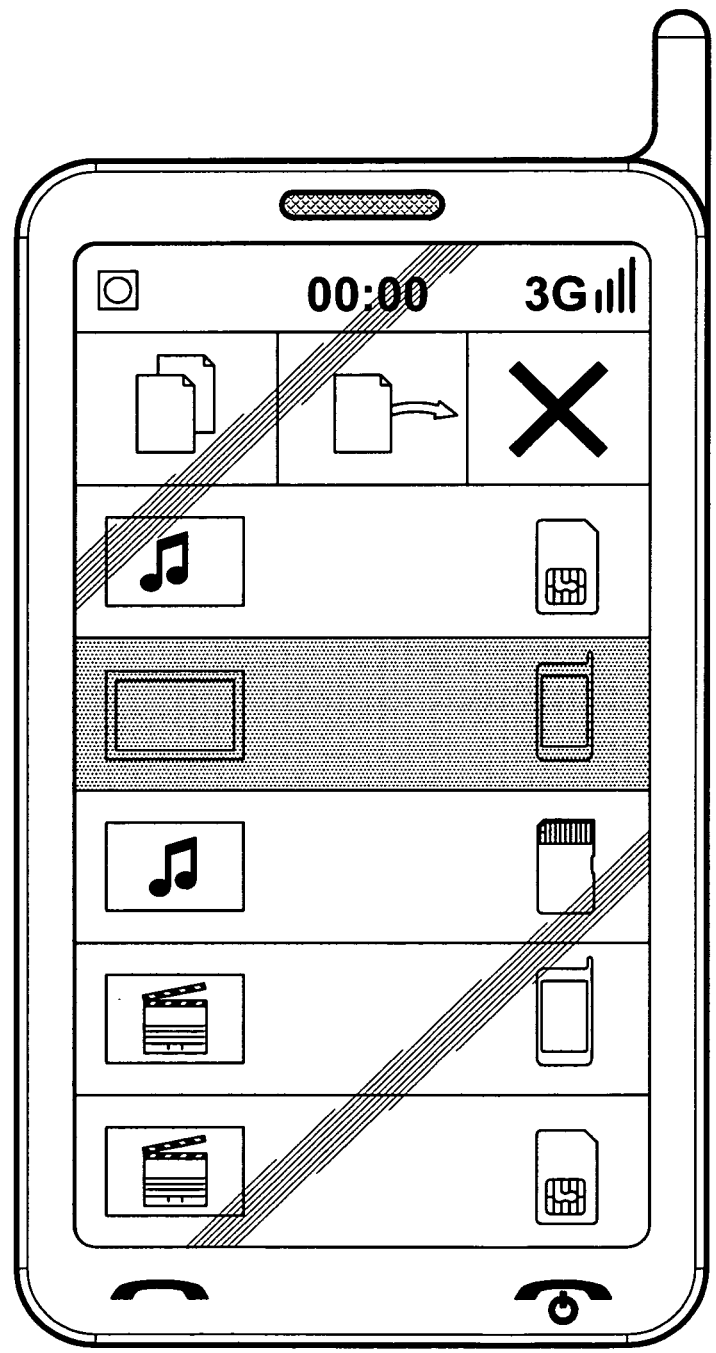
FIG. 4 is a view of a first display of the mobile telephone of FIG. 1.
Figure 5:
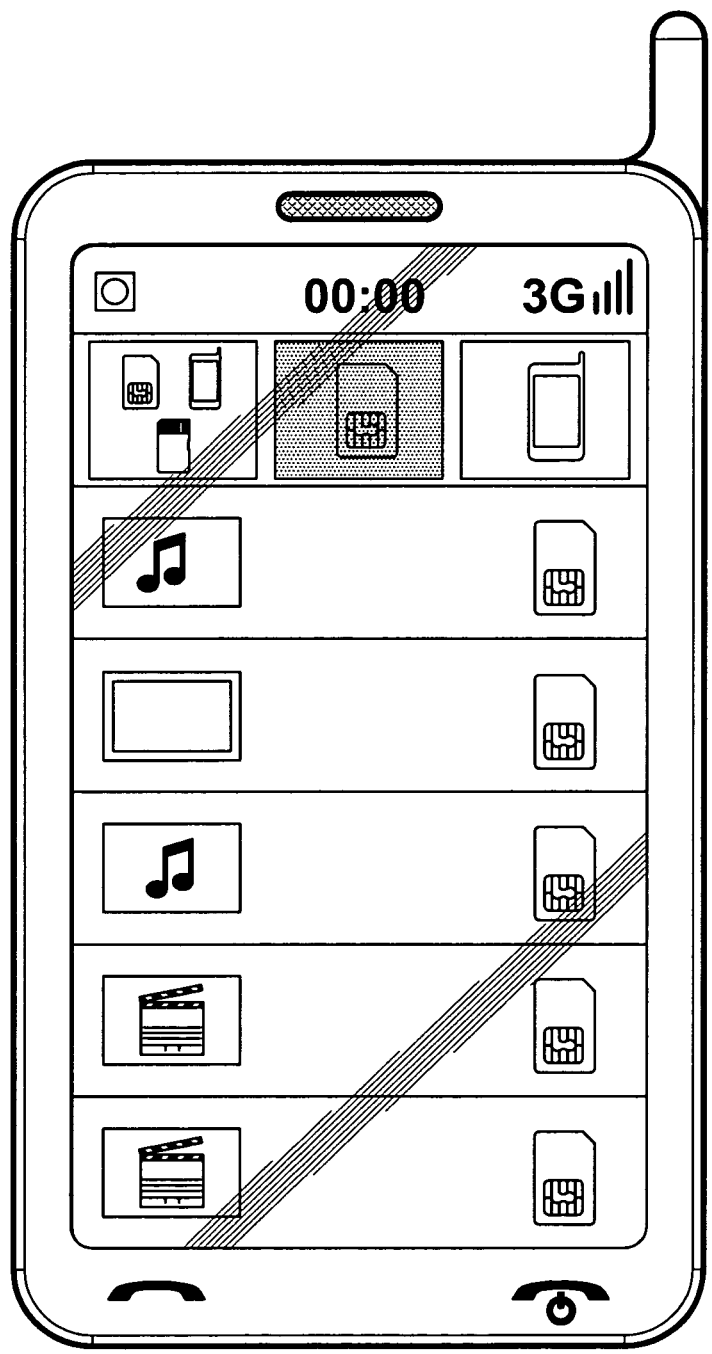
FIG. 5 is a view of a second display of the mobile telephone of FIG. 1.

Two display screens of the content presentation application 38 are shown in FIGS. 4 and 5.

The presentation application for the content 38 in particular comprises a multimedia content management function 82 and a storage volume management function 84. It also comprises a music reading function 86, an image reading function 88 and a video reading function 90.

The multimedia content management function 82 allows the user to copy or move content within a same partition or from one partition to another partition or from one storage volume to another storage volume. It also allows the user to delete content, or rename it.

In a known manner, the function 82 is adapted so as, during copying, movement, deletion or renaming of content, to modify the data stored on the or each storage volume 12, 14, 16 concerned. It is also adapted to simultaneously update the or each concerned database 60, 62, 64, 66.

The storage volume management function 84 allows the user to choose between a presentation mode in which the content stored on different storage volumes is all presented at the same time, as shown in FIG. 4, or a presentation mode where only the content stored on a same storage volume is presented, as shown in FIG. 5, where only the content stored on the MMSIM card 16 is displayed. It is also adapted only to present the multimedia content meeting certain criteria chosen by the user.

The function 84 is thus adapted to send requests to the content suppliers 72, 74, 76 specifying the presentation criteria chosen by the user.

The music reading 86, image reading 88 and video reading 90 functions call on the Android standard libraries.

The operating method of the mobile telephone according to the invention will now be described.

The mobile telephone is started up. During start-up, the daemon 44 reads the configuration file 48 and loads the libraries adapted to listen to information coming from the MMSIM card detection module 42.

The MMSIM card 16 is inserted into the telephone. A notification emitted by the module 42 then informs the daemon 44, via a UEVENT mechanism, of the presence of the MMSIM card 16. The daemon 44 then commands the assembly of the partition of the MMSIM card 16 as a function of the content of the configuration file 48. The daemon 44 then informs the listening program 46 of the assembly of the MMSIM card 16 by sending a message via an inter-process communication generally known as a socket.

The listening program 46 then notifies the media scanners 54, 56 and the content suppliers 74, 76 of the assembly of the MMSIM card 16. The media scanners 54, 56 then call on the scanning module 50 to scan the partitions 16a and 16b of the MMSIM card 16. Each media scanner 54, 56, respectively, compares the information collected during the scan of the unencrypted partition 16a, the encrypted partition 16b, respectively, with any information stored in the respective database 64, 66, respectively, and records, in the respective database 64, 66, respectively, new information representative of the content stored on the scanned partition 16a, 16b, respectively, information that does not previously appear in the respective database 64, 66, respectively.

Alternatively, the MMSIM card 16 is already inserted when the telephone is turned on. The steps described above then take place when the telephone is turned on.

The user can then launch the content presentation application 38. Upon this launch, the content presentation application 38 sends a request to the content suppliers 72, 74, 76, which each return a list to it of the content whereof the information is stored in their databases 60, 62, 64, 66. The content presentation application 38 aggregates these lists into a unified list that it makes available to the user, via the visual supply means.

The user can then, via the content management function 82, copy, move, delete or rename content stored on a partition of one of the storage volumes 12, 14, 16.

As an example, when content is moved from the SD card 14 toward the unencrypted partition 16a of the MMSIM card 16, in a known manner, the data stored on the SD card 14 is copied toward the MMSIM card 16, then deleted from the SD card 14. At the same time, the function 82 notifies the content supplier 72 associated with the SD card 14 and the content supplier 74 associated with the MMSIM card 16 of the change having taken place. Each content supplier 72, 74, respectively, then updates the associated database 62, 64, respectively.

The volume management function 84 also allows the user to choose the content presentation mode. Thus, if the user for example chooses only to see the content stored on the MMSIM card 16, the volume management function 84 removes the content from the list provided by the content manager 72 associated with the other storage volumes 12, 14. If on the other hand the user chooses only to display music composed by a certain artist, the volume management function 84 sends a new request to the content suppliers 72, 74, 76 so they return lists to the application 38 that contain only the content meeting the specified criteria.

When the MMSIM card 16 is ejected, a notification emitted by the MMSIM card detection module 42 then informs the daemon 44, by a UEVENT mechanism, of the ejection of the MMSIM card 16. The daemon 44 then commands the disassembly of the MMSIM card 16 and informs the listening program 46 of the disassembly of the MMSIM card 16 by sending a message on a socket.

The listening program 42 notifies the content suppliers 74, 76 of the disassembly of the MMSIM card 16. The MMSIM content supplier 62 then closes its MMSIM database 72 so as to make it invisible for the applications 28. At the same time, the secured content supplier 76 erases the content from its secured database 66.

The embodiment described here constitutes one preferred embodiment of the invention. However, the mobile telephone according to the invention can also support other storage volumes, such as MMC cards, without going beyond the scope of the invention. The MMSIM card can also be replaced by another type of flash memory card. The MMSIM card can include a plurality of secured partitions. The SD card can also include at least one secured partition.

Owing to the invention, a mobile telephone managed by an Android platform can manage content stored on storage volumes other than an SD card and stored on a plurality of storage volumes.

Furthermore, the changes made to the original platform allow performance of the operations in an optimal timeframe and are compatible with the evolutions of the Android platform.

Lastly, the telephone better performs functions, accessible to the user within a unified interface, which allows a simplified use of the telephone by the user.

What is claimed is:

1. A mobile telephone, managed by an Android platform housing applications, the mobile telephone comprising:
    a data storage divided into a plurality of storage volumes, each storage volume including at least one partition, each partition of each storage volume being adapted to store content;
    a supply chain for supplying content stored in the storage volumes to the user, the supply chain including:
    a detector for detecting the storage volumes, the storage volume detector including a single daemon and a single program for listening to the daemon;
    a reader for reading the storage volumes, the reader including a plurality of volume scanners;
    a content supply device including a plurality of content suppliers for supplying content to the applications; and
    at least one content presentation application.

2. The mobile telephone as recited in claim 1 wherein the volume scanners comprise a multi-volume scanner adapted to scan several storage volumes, and at least one single-volume scanner adapted to scan only a single storage volume.

3. The mobile telephone as recited in claim 1 wherein the volume scanners comprise at least one secured partition scanner adapted to scan encrypted partitions of the storage volumes.

4. The mobile telephone as recited in claim 3 wherein the at least one secured partition scanner is specific to a single storage volume of the storage volumes.

5. The mobile telephone as recited in claim 1 wherein the content suppliers comprise a multi-volume content supplier adapted to provide content stored on different volumes, and at least one single-volume content supplier adapted to provide only content stored on a same storage volume.

6. The mobile telephone as recited in claim 1 wherein the content suppliers comprise at least one encrypted content supplier adapted to make encrypted content stored on encrypted partitions of the storage volumes available to the applications.

7. The mobile telephone as recited in claim 6 wherein the at least one encrypted content supplier is specific to a single storage volume of the storage volumes.

8. The mobile telephone as recited in claim 1 wherein the content supply device further includes databases for storing information collected by the volume scanners and representative of the content stored on the storage volumes, the content suppliers being adapted to make this information available to the applications, each database storing information representative of the content stored on a same storage volume of the storage volumes.

9. The mobile telephone as recited in claim 8 wherein the databases comprise at least one secured database for storing information representative of encrypted content stored on encrypted partitions of the storage volumes.

10. The mobile telephone as recited in claim 1 wherein one of the storage volumes is a memory of a multimedia SIM card connected to the telephone, the multimedia SIM card incorporating a web server and an auxiliary storage memory.

11. The mobile telephone as recited in claim 10 wherein the SIM card includes at least one encrypted partition for storing encrypted data.

* * * * *